Aug. 12, 1969

C. R. STEELE 3,460,695

SWING-OUT TIRE RACK

Filed Nov. 9, 1967

INVENTOR
CHESTER R. STEELE

BY Colton + Stone

ATTORNEYS

United States Patent Office 3,460,695
Patented Aug. 12, 1969

3,460,695
SWING-OUT TIRE RACK
Chester R. Steele, Sherman, Tex., assignor to Swing Co., Inc., Sherman, Tex., a corporation of Texas
Filed Nov. 9, 1967, Ser. No. 681,670
Int. Cl. B62d 43/00
U.S. Cl. 214—454                                    7 Claims

ABSTRACT OF THE DISCLOSURE

The disclosure is directed to an automotive tire rack mounted beneath the body of a vehicle to provide ready accessibility to the tire carried thereon. The tire rack includes upper and lower support arms which are mounted for limited vertical swinging movement underneath a vehicle body by virtue of a loose connection between the lower arm and the vehicle frame. The upper arm, which carries the tire, is pivotally supported by the lower arm through a pivot connection which permits movement of the upper arm through 360° relative to the lower arm. The rear end of the tire rack may thus be dropped down below the level of the vehicle body by virtue of the loose pivot connection between the lower arm and frame to permit the upper arm to be swung outwardly, in either direction, to make the tire readily accessible adjacent either side of the vehicle.

Background of the invention

This invention relates to automotive tire carriers and, more particularly, to truck mounted tire carriers which are supported underneath a truck bed.

Many of the prior art tire carriers of the type supported beneath a truck bed have required an operator to crawl underneath the truck to remove the spare tire from its carrier which adds greatly to the time and effort involved in changing a tire. Other prior art tire carriers involve flexible connections between the tire and vehicle frame whereby the wheel may be lowered by operating a pulley or the like which, although an improvement over the first mentioned class of tire carriers, still leaves the spare tire beneath the vehicle and requires the movement of an operator beneath the truck to remove the tire. Although swing-out tire carriers have been previously suggested, as in U.S. Patent 2,956,716, certain of these prior art carriers leave much to be desired in providing ready assessibility under all load conditions. Specifically, in some prior art swing-out tire carriers, the same have possessed only limited degrees of outward swinging movement relative to the truck body on which they are mounted. This capability of limited outward swinging movement severely restricts ready accessibility to the tire under certain conditions such as unusual terrain or adverse road conditions. For example, the accessibility of a swing-out tire carrier which swings out adjacent the right rear end of the truck would be somewhat impaired if the truck were stopped immediately adjacent a ditch, embankment or bridge rail on the right side of the road. Additionally, on dual highways, it may be necessary for a truck to pull off on the left side of the road to repair a flat tire. In this instance, a tire carrier which swings out to the right makes it necessary for the operator to assume a position in the face of oncoming traffic to remove the spare tire.

A further disadvantage in known swing-out carriers is that the travel position of the same must be at a level below the truck undercarriage which lies within the path of the carrier's arcuate movement so as not to interfere with the outward swinging movement of the carrier. In all known swing-out carriers with which applicant is familiar, the bolt or other securing means which stabilizes the carrier in the travel position can only be reached by crawling underneath the truck since the same is normally positioned remote from the pivot axis which is, necessarily, adjacent the vehicle periphery.

Summary of the invention

A primary object of the invention is to eliminate the above mentioned disadvantages of conventional tire carriers.

It is among the further objects of the invention to provide a tire carrier which is normally carried underneath a bed of a truck and which may be dropped down to permit a spare tire carried thereon to be swung out from underneath a truck to either side thereof; to provide a tire carrier that may be easily installed on virtually any type truck; to provide a tire carrier having a minimum of moving parts and in which the tire may be readily moved between its travel of carry position underneath the truck and a position beyond the vehicle periphery for easy handling; to provide a tire carrier that can be adjusted to accept any size hub and tire while providing for adjustment of the same to insure a snug fit of the tire and carrier against the underside of a truck and partly above the level of the truck undercarriage; and to provide securing means for the tire carrier which is adjacent both the carrier pivot axis and the vehicle periphery so that the same may be released by an operator merely by extending one hand underneath the truck.

Description of the preferred embodiment

Figure 1:
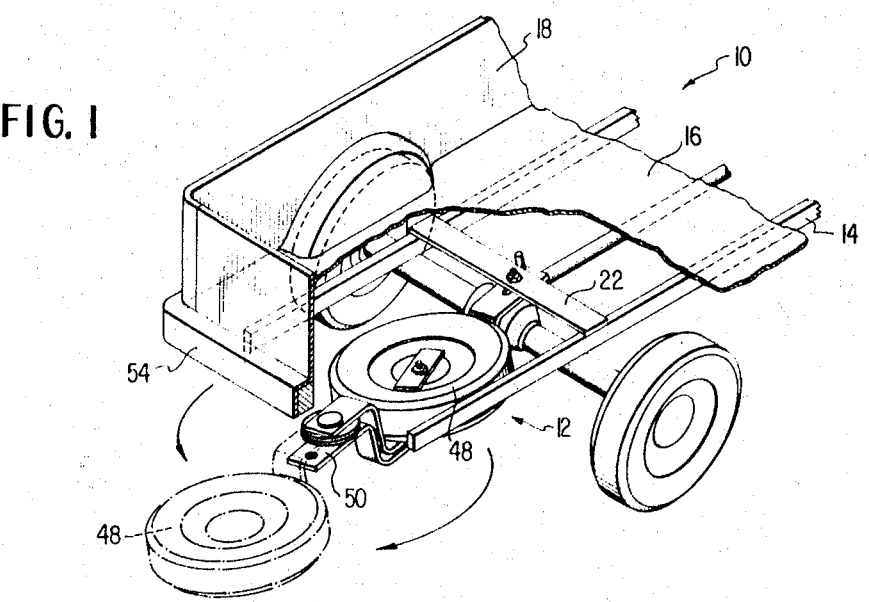
FIGURE 1 is a fragmentary perspective view, partially broken away, of a truck body provided with a novel tire carrier according to the invention, the tire carrier being illustrated in the drop-down position.

A truck 10, provided with a tire carrier 12 embodying the invention, is fragmentarily illustrated in FIGURE 1 as including frame members 14, bed 16 and peripheral walls 18. Lower arm 20 of tire carrier 12 is suspended from cross member 22 secured to frame members 14 by loose connection means 24 which permits the tire carrier to drop down from the travel position shown in FIGURE 2 to the position shown in FIGURE 1. Loose connection means 24 includes an oversized bolt hole 26 formed in lower arm 20 loosely receiving bolt 28 provided with a compression spring 30 intermediate the bolt head and lower arm 20. Bolt 28 extends through a hole in cross member 22 to receive a nut 32 which permits vertical adjustment of the forward end of tire carrier 12 relative to the vehicle undercarriage. Pin 34 upstanding from the upper surface of lower arm 20 acts as an abutment to engage cross member 22 and limit the downward swinging movement of the tire carrier to the full line position shown in FIGURE 3 while precluding substantial lateral movement of the lower arm as will be appreciated from an inspection of FIGURE 1. Lower arm 20 is depressed intermediate the ends thereof to form a depression 36 of substantially constant depth throughout a major portion thereof and of sufficient size to house a conventional truck tire.

Upper arm 38 is supported by lower arm 20 for rotational movement through 360° by pivot means 40 which includes relatively large pivot or bearing plates 42, 44 respectively secured to arms 20, 38 and a pivot pin 46. It will be noted that upper arm 38 is contoured similarly to the lower support arm throughout the length of the shorter upper arm which terminates, at that end remote from pivot means 40, adjacent the center of depression 36 when the arms are in the superposed travel position of FIGURE 2. Arm 38 is provided with an upstanding wheel support lug adjacent the end thereof remote from the pivot means on which spare tire 48 is adapted to be mounted.

The end of lower arm 20 has a portion 50 adjacent pivot means 40 which extends further beyond pivot pin 46 than does the corresponding end of the upper arm. A bolt hole is formed in portion 50 of the lower arm through which a bolt 52 may be inserted to secure the rear end of tire carrier 12 to a rear vehicle frame member 54.

Figure 2:
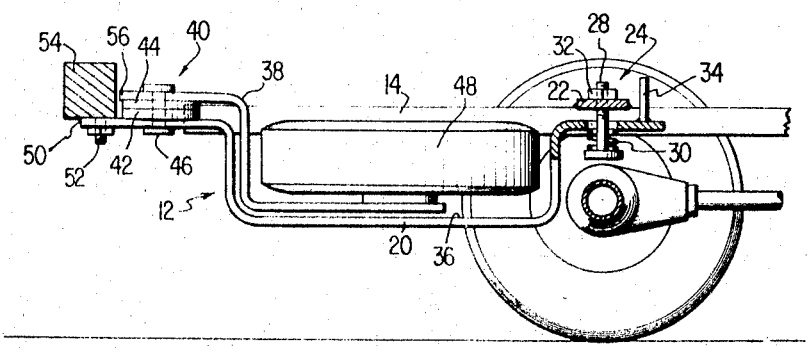
FIGURE 2 is a side view, partially in elevation and partially in section, illustrating the tire carrier in the travel or carry position.
Figure 3:
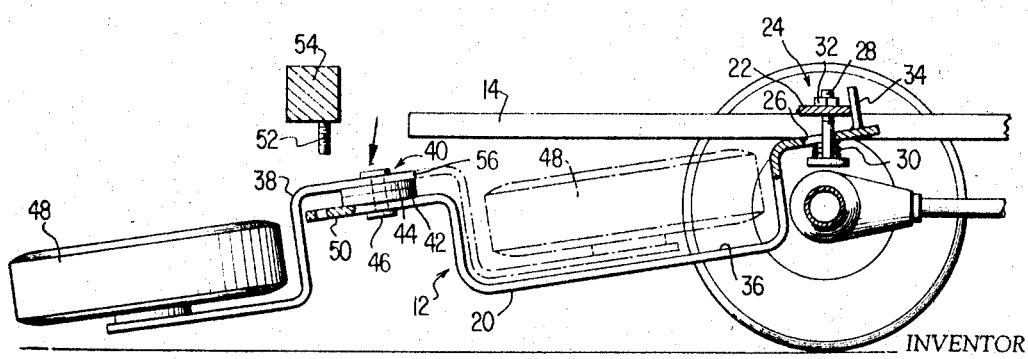
FIGURE 3 is a side elevational view, partly in section, illustrating the manner in which the tire carrier drops down and swings out from underneath a truck.

In operation, assuming tire carrier 12 to be in the travel position shown in FIGURE 2; in order to gain access to spare tire 48 it is only necessary to remove the nut from bolt 52, which is immediately adjacent the vehicle periphery, and rotate upper arm 38 rearwardly as indicated in phantom lines in FIGURE 1. Upon removing the nut from bolt 52, the rear end of tire carrier 12 drops to the full line position of FIGURE 1 due to the loose connection means between the front end of the carrier and the vehicle frame. An operator may then stoop down and reach underneath the truck to grasp that portion of upper arm 38 adjacent pivot means 40 to rotate the same rearwardly, in either direction, from the solid line position of FIGURE 1 to the solid line position shown in FIGURE 3 or to any intermediate position as indicated by the arrows in FIGURE 1.

It will be noted that the rear end 56 of upper arm 38 lies immediately adjacent frame member 54 in the travel position so that rotational movement of arm 38 about pivot pin 46, in the travel position, is restrained by abutment of one side edge of rear end 56 with frame member 54.

It will be appreciated by those skilled in the art that the tire carrier herein described fulfills the stated objects of the invention in a novel and inexpensive manner and it is not intended that the invention should be limited beyond the scope of the claims.

I claim:

1. A swing-out tire rack for automotive vehicles, comprising; upper and lower support arms, pivot means interconnecting said arms adjacent one end thereof and mounting the same for relative pivotal movement through 360°, said lower arm having end portions extending further outwardly from said pivot means than the corresponding ends of said upper arm when superimposed upon each other, each of the lower arm end portions having connecting means for connecting the same to an automotive frame, and tire mounting means secured to and extending upwardly from the end of said upper arm remote from said pivot axis.

2. The invention as defined in claim 1 wherein an intermediate portion of said lower support arm is formed with a downward depression of substantially constant depth over the major portion of said depression to house an automotive tire, and said upper arm being configured throughout its length to allow the contour of said lower arm whereby an automotive tire supported on said tire mounting means may be swung out of and into housed position within said depression from either side thereof.

3. The invention as defined in claim 2 wherein the lower arm connecting means remote from the pivot means includes a loose connection whereby the tire rack may be supported on an automotive frame for limited vertical swinging movement, and an abutment extending upwardly from the end of the lower arm remote from the pivot means to limit the downward vertical swinging of the tire rack by engagement with the means for supporting the tire rack on the automotive frame.

4. An automotive vehicle having a drop-down swing-out tire rack, comprising; upper and lower support arms, pivot means interconnecting said arms adjacent one end thereof for relative pivotal movement through 360°, said lower arm having first and second end portions adjacent and remote from said pivot means, respectively, extending further outwardly from the pivot means than the corresponding ends of said upper arm when superimposed upon each other, loose connection means interconnecting said lower arm second end portion and the undercarriage of said vehicle at a point remote from the outer periphery thereof for limited swinging movement in a substantially vertical plane, tire mounting means secured to and extending upwardly from the end of said upper arm remote from said pivot axis, and means detachably securing said lower arm first end portion to the undercarriage of said vehicle adjacent the periphery thereof whereby upon detachment of the securing means the loose connection means allows the tire rack to drop down to facilitate swinging said upper arm outwardly of the vehicle periphery from its normal travel position in superposed relation to said lower arm beneath said vehicle through 180° to either side of said lower arm.

5. The invention of claim 4 wherein an intermediate portion of said support arm is formed with a downward depression of substantially constant depth over the major portion of said depression to house an automotive tire, said upper arm being configured throughout its length to follow the contour of said lower arm and being normally supported thereon in the carry position with said tire mounting means being substantially centered in said depression.

6. The invention as defined in claim 5 wherein said loose connection means includes abutment means upstanding from said lower arm and positioned for engagement with the vehicle undercarriage to limit the downward swinging movement of said tire rack.

7. The invention as defined in claim 6 wherein said loose connection means includes adjusting means for varying the permissible degree of vertical swinging movement of said tire rack.

References Cited

UNITED STATES PATENTS 1,649,679  11/1927  Freivogel _____ 214—453 X

HUGO O. SCHULZ, Primary Examiner

U.S. Cl. X.R.

224—42